INVENTORS
WILLIAM A. CARTER
OTTO JENSEN
BY
OSTROLENK, FABER, GERB & SOFFEN
ATTORNEYS

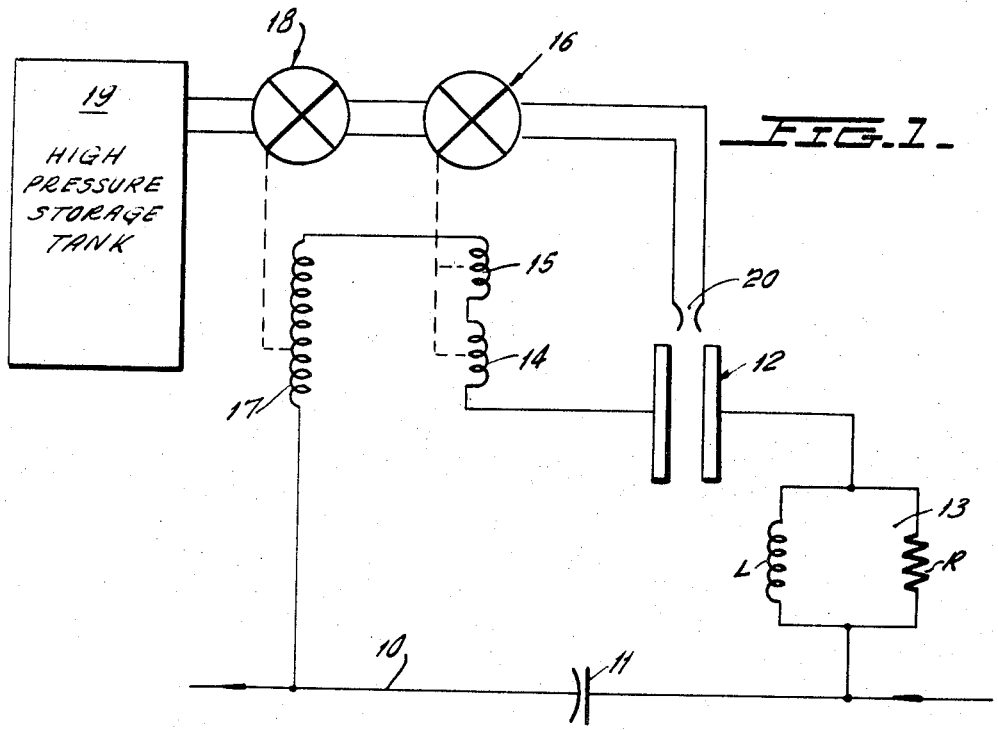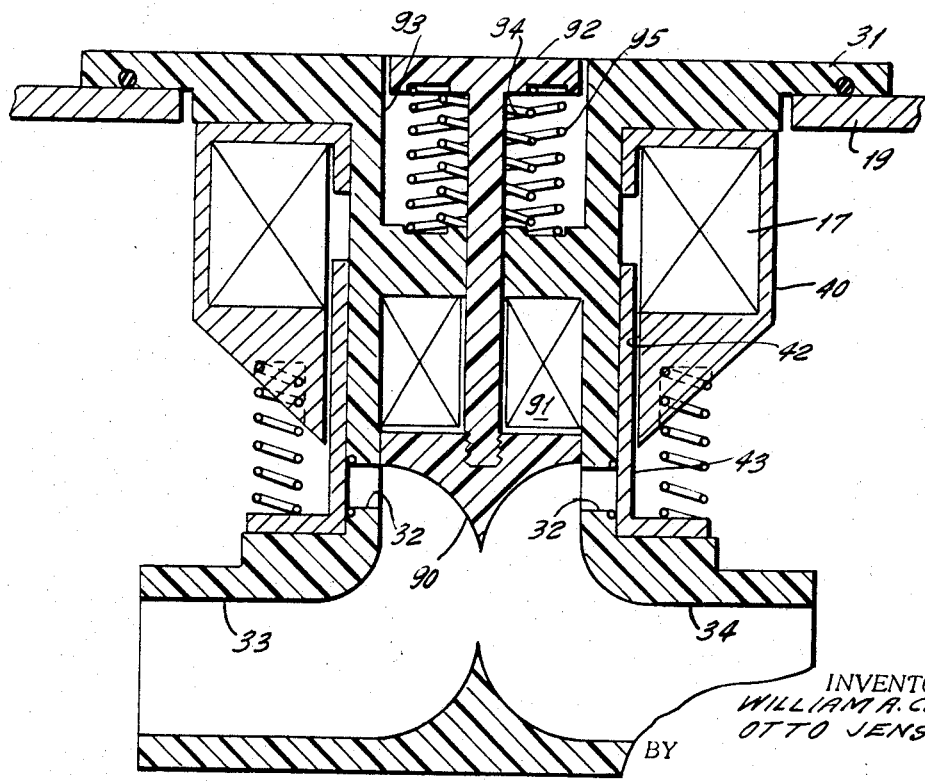

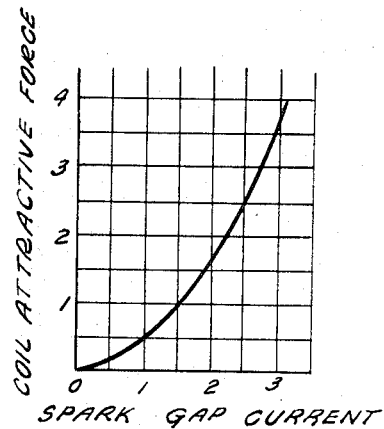
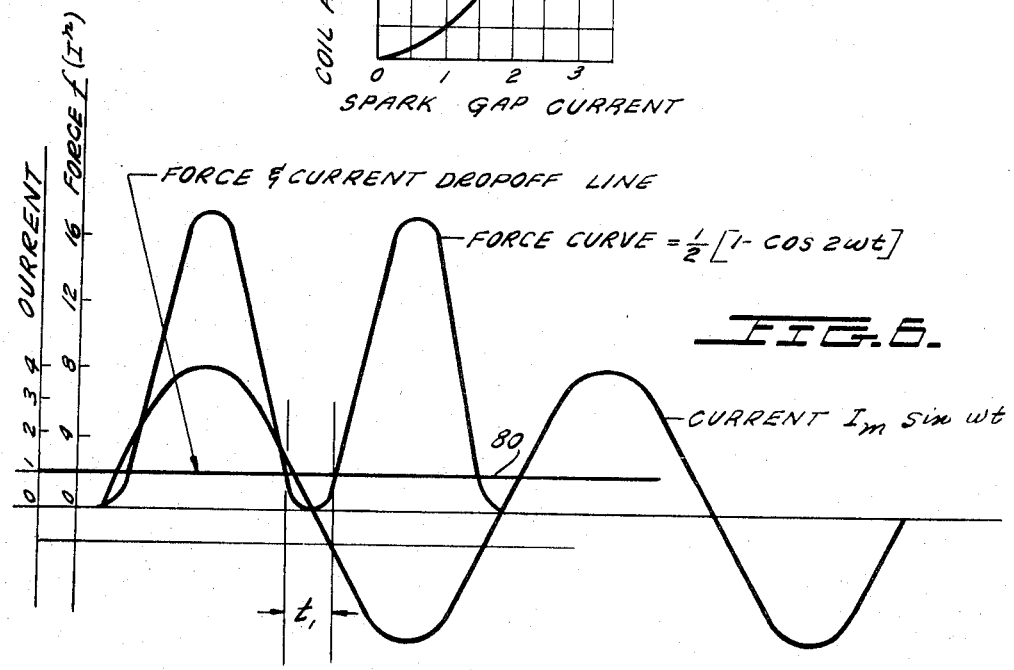
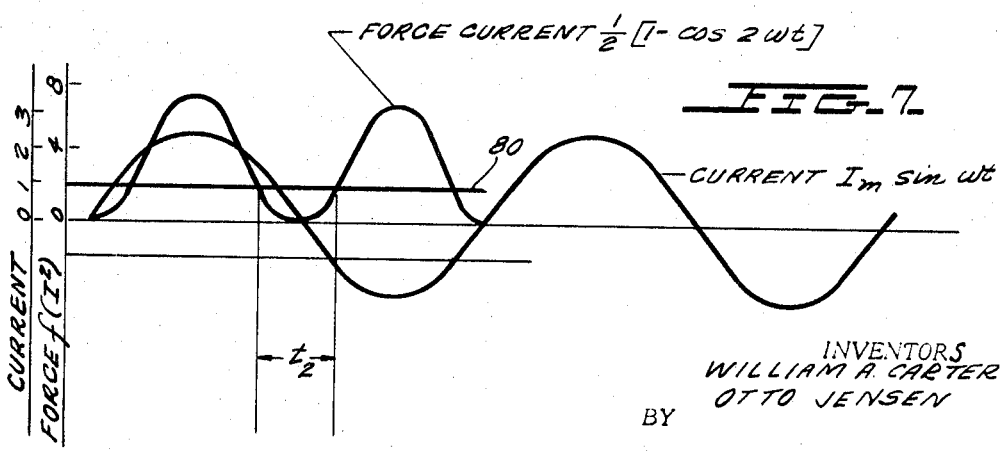

3,416,034
CAPACITOR PROTECTION SYSTEM INCLUDING A PLURALITY OF SERIALLY CONNECTED VALVES IN THE AIR BLAST DEVICE

William A. Carter, Devon, and Otto Jensen, Malvern, Pa., assignors to I-T-E Circuit Breaker Company, Philadelphia, Pa., a corporation of Pennsylvania
Filed Apr. 14, 1966, Ser. No. 542,655
9 Claims. (Cl. 317—12)

ABSTRACT OF THE DISCLOSURE

A valve structure for a capacitor protection system for admitting a blast of air between a pair of arcing electrodes in order to deionize the arc until the arc current exceeds a particular value. Two valve structures are used in series with one another, where one valve is normally closed and opens and is held open responsive to the flow of current in a spark gap circuit. The second valve is a high speed valve in series with the first and is normally open, but is closed responsive to the flow of arc current in the spark gap circuit until the arc current has a sufficiently low magnitude such that the capacitor can be returned to the circuit and the arc in the spark gap can be extinguished. Thus, flow of arc extinguished air will occur until the spark gap is to be finally removed from parallel connection with respect to a capacitor being protected.

---

This invention relates to a novel magnetically operated valve, and more specifically relates to a novel current sensitive high speed valve for controlling the air blast to a spark gap which may be used in the protection of a capacitor.

Protective schemes are well known for series capacitor systems. Thus, when series capacitors are placed in a transmission line, during periods of the transmission line fault, high overvoltages on series capacitors can seriously damage the capacitor. Therefore, it is common practice to provide spark gaps in parallel with the series capacitors, which spark gaps break down when the voltage across the series capacitor reaches a sufficiently high value due to the short circuit current passing through the capacitive reactance.

Once the spark gap has flashed over, it will short circuit the series capacitor in parallel with the gap and the gap must sustain the subsequent arcing until it is isolated from the faulted circuit by the opening of a series connected disconnect switch or until the arc in the spark gap space is extinguished by some appropriate interrupting capability built into the spark gap structure. That is to say, it is possible to provide means associated with the spark gap which will cause it to be self-extinguishing.

A typical manner for making the gap self-extinguishing is by providing means for rapidly deionizing the space between the electrodes on the occurrence of a zero current for the arc. This is commonly accomplished by admitting a blast of gas such as sulfur hexafluoride or a blast of extinguishing air into the volume between the electrodes which will sweep ionized gas products out of the arc gap prior to current zero. Thus, a restrike between the electrodes is avoided as the voltage susbequently builds up across the arc electrodes.

With this type of self-extinguishing spark gap, it is necessary to provide a suitable valve for admitting a gas blast to the space between the arcing electrodes at an appropriate time.

At present, a magnetically operable pneumatic valve is connected between the volume between the arcing electrodes and a source of high pressure gas with the valve which is normally closed. A current transformer associated with the capacitor discharge current through the arc electrodes is then connected to a magnetic operating means for the valve so that the valve is opened as soon as the capacitor begins to discharge through the spark gap. That is to say, the valve is opened as soon as the gap breaks down.

Such a system will, therefore, continuously sweep the spark gap volume free of ionized products due to arcing, thereby rendering the spark gap capable of producing a current interruption each time the arc current passes through zero.

The present invention recognizes that it is not desirable to extinguish the arc current at each current zero for as long as the transmission line fault condition continues to exist. That is, if the gap clears at each current zero and the fault continues to exist on the transmission line, the spark gap will refire as soon as the capacitor voltage reaches its pre-set voltage magnitude requiring the firing of the spark gap. This refiring will, therefore, occur after each current zero until the fault is cleared, thereby subjecting the capacitor to successive damaging discharges through the spark gap. This condition will not only endanger the capacitor, but, since there will be a continuous flow of air through the spark gap, will consume relatively large quantities of air, thus requiring that the air or gas supply system be relatively large.

A primary object of the present invention is to provide a novel valving arrangement for controlling the flow of arc deionizing gas or air only when the dangerous fault condition has been removed from the capacitor, as indicated by the level of the arc current flowing through the arcing electrodes. Thus, if the fault condition continues for some predetermined number of cycles, a blast of extinguishing air through the spark gap will occur only when the arc current indicates that the dangerous fault situation has ceased to exist and the capacitor can be safely returned to the line.

It will be apparent that this will then substantially conserve air from the air supply and will, therefore, require a much smaller air supply system, thereby effecting a considerable saving in cost for the system.

Moreover, the capacitor will not be subjected to the surge condition imposed by refiring the spark gap every half cycle so long as the fault condition remains on the line being protected by the capacitor.

The novel valve means constructed in accordance with the invention also has an extremely high speed operation during the required blasting operation which permits a further saving in air or gas used during the deionizing of the spark gap.

In accordance with the present invention, a novel valving system is provided which includes two valve structures connected in series between the high pressure storage tank and the discharge nozzle leading to the spark gap. Each of these valves are operated by a suitable magnetic system which responds to the current in the spark gap circuit.

The first of the valves is one similiar in nature to the presently used valve system, and is a valve which is normally closed but which opens and is held open responsive to the flow of current in the spark gap circuit. Note that in the past, this would be the only valve in the system, and would permit the flow of air from the high pressure source to the discharge nozzle whenever the fault on the transmission line was such that the arc gap should fire and arc current would flow in the spark gap circuit.

In accordance with the invention, a second and high speed valve is provided in series with the first valve with the second and high speed valve being normally open. The second valve will close responsive to the flow of arc current in the spark gap circuit until this arc current has a sufficiently low magnitude to indicate that the capacitor can be returned to the circuit and saprk gap can be extenguished. Thus, this second valve will reopen to permit the flow of air from the high pressure storage tank to the discharge nozzle only when conditions are such within the transmission line fault that the capacitor can be safely returned to its normal series operation. Therefore, the flow of extinguishing air will occur only when the spark gap is to be finally removed from its parallel current conducting condition with respect to the series capacitor.

Moreover, the high speed operation of the valve will permit the connection from the high pressure storage tank to the nozzle for a relatively short period of time so that excessive air or gas is not discharged through the spark gap. Note that this second valve can be high speed since it is not responsible for normally shutting off gas flow from the high pressure supply system, but need only shut off the supply during the few cycles of a fault condition.

Accordingly, a primary object of this invention is to provide a novel arc extinguishing system for a spark gap which substantially reduces the size of the high pressure storage tank required.

Another object of this invention is to intentionally prevent the extinguishing of the arc in a spark gap in parallel with a series capacitor until the line fault conditions have reduced to a value sufficiently safe to permit the return of the series capacitor to the circuit.

Another object of this invention is to provide a novel valve structure which has an extremely high speed operation.

A further object of this invention is to provide a novel high speed valve structure which is magnetically operated in response to a fault condition as measured by the current through a spark gap.

These and other objects of this invention will become apparent from the following description when taken in connection with the drawings, in which:

FIGURE 1 is a schematic circuit diagram of the present invention.

FIGURE 4 illustrates the attractive force between the coils of FIGURE 2 as a function of spark gap current.

FIGURE 5 illustrates one manner in which the valve structure of FIGURE 4 can be modified to eliminate one of the coils therein.

FIGURE 6 illustrates the force applied to the high speed valve of FIGURES 2 and 5 and the current through the capacitor, each as a function of time for a fault current condition.

FIGURE 7 is similar to FIGURE 6, and illustrates the force curves and current curves when the current in the transmission line has been reduced to a value sufficiently low to permit the reconnection of the series capacitor into the transmission line circuit.

Figure 2:
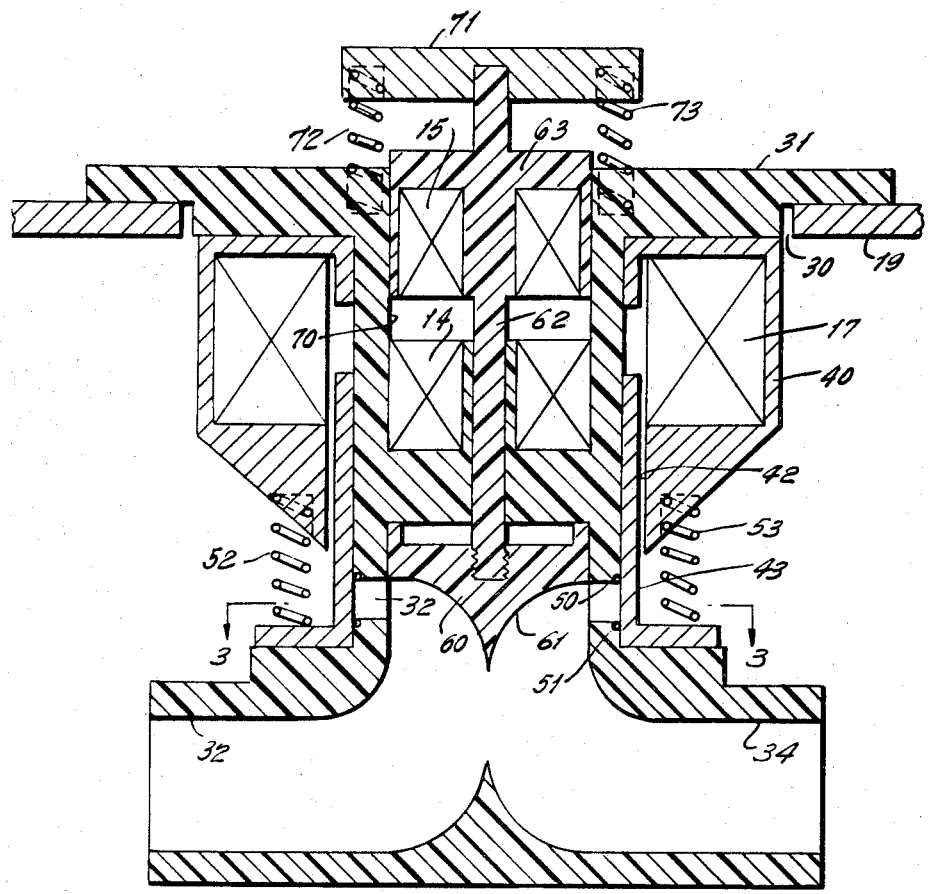
FIGURE 2 is a cross-sectional view of the novel valve structure constructed in accordance with the invention and which can be connected directly in the circuit of FIGURE 1.

Referring first to FIGURE 1, there is schematically illustrated therein the novel invention which includes a transmission line 10 which has a series capacitor 11 therein. It is well known to provide a protective circuit for the series capacitor 11 which includes a spark gap which effectively short circuits the series capacitor 11 when a fault condition exists in the transmission line 10. Such arrangements are shown in copending application Ser. No. 259,238, filed Feb. 18, 1963 in the name of Murry K. Price et al., entitled Rapid Reinsertion Protection System for Series Capacitor Bank, now U.S. Patent 3,249,813, and assigned to the assignee of the present invention.

FIGURE 1 schematically illustrates a spark gap 12 which may be of the type shown in copending application Ser. No. 249,110, filed July 10, 1963, in the name of Otto Jensen et al., entitled Main Series Capacitor Protective Spark Gap, now U.S. Patent 3,210,590, and assigned to the assignee of the present application, and which is connected in parallel with the capacitor 11. More particularly, a parallel circuit is formed of an L-R network 13 connected in series with spark gap 12 and further includes, in accordance with the invention, windings 14 and 15 associated with a first magnetically operable valve 16 and winding 17 associated with a second magnetically operated valve 18.

The input side of valve 18 is then connected to a suitable high pressure storage tank 19, and is connected in series with valve 16 whose outlet is connected to a nozzle 20 which is disposed to introduce a blast of deionizing gas or air from the high pressure storage tank 19 into the spark gap 12 when both valves 16 and 18 are open. This will then act to deionize the volume between the spark gap electrodes so that when a current zero arc current through spark gap 12 is reached, the spark gap will automatically extinguish.

In accordance with the invention, the valve 18, which may be similar to the standard single valve now used, is one which is normally closed and is opened when its magnetic sensing coil 17 senses the existence of a current in the spark gap circuit. That is to say, if there is a fault in the transmission line 10, the voltage across capacitor 11 will exceed some predetermined value thus leading to the firing of spark gap 12 and the conduction of current through the spark gap 12 in parallel with capacitor 11, thereby to protect the capacitor so long as the fault exists in transmission line 10.

The energization of coil 17 by this spark gap current will cause the opening of valve 18, thus permitting a blast of air from nozzle 20 which normally sweeps the spark gap 12 clean of arc products so that the spark gap would normally extinguish every half cycle, or at every current zero magnitude.

In the past, and where the valve 18 was the only control valve in the system, the spark gap, after being extinguished, returns the capacitor 11 to the transmission line 10, and, if the fault still exists on transmission line 10 during the next half cycle when the voltage across capacitor 11 is sufficiently high, the spark gap 12 refires and this process continues with the extinction of the arc at each current zero as a result of valve 18 being open and supplying air or gas to the nozzle 20.

In accordance with the invention, a normally open valve 16 is connected in series with the normally closed valve 18, with the normally open valve 16 being closed responsive to the sensing of arc current in the circuit of spark gap 12, as indicated by coils 14 and 15.

The valve 16, however, is an extremely high speed valve which is reopened when the current in the spark gap circuit decreases below some predetermined value. This current magnitude at which valve 16 reopens is selected to be low enough to return the capacitor 11 safely to the transmission line circuit without expecting further need to remove the capacitor from the circuit in the next half cycle. Therefore, valve 16 will be open only at the end of the fault condition which causes spark gap 12 to fire and the blast of extinguishing air will flow through nozzle 20 only at this time as contrasted to every half cycle during the time the fault exists.

Moreover, and in addition to substantially saving on the required capacity of the high pressure storage tank 19, the system eliminates the necessary restrike of the spark gap each half cycle, and the consequent discharge surge current from capacitor 11 each half cycle which will exist when only a valve such as valve 18 is used.

FIGURES 2 and 5 illustrate two manners in which valves 16 and 18 could be built in a common structure.

Referring first to the embodiment of FIGURE 2, there is illustrated a portion of the wall of high pressure tank 19 which has an opening 30 therein for receiving a stationary valve support structure 31. The lower portion of support structure 31 is immersed in the interior of the high pressure tank and includes intake ports 32 (see FIGURE 3) which communicate between the high pressure interior of storage tank 19 and exhaust ports 33 and 34 which are suitably taken through the wall of high pressure storage tank 19 in any suitable manner (not shown) and to the discharge nozzle such as nozzle 20 of FIGURE 1.

It will be noted that body 31 is suitably secured within opening 30 of tank 19 using standard gasketing techniques to prevent leakage at this connection.

A coil support structure 40 which contains winding 17 (FIGURE 1) is then suitably secured to support 31 and has, at the lower end thereof, an annular chamber 42 which receives valve 43. The sleeve valve 43 is movable over the outer surface of support 31 and within the annular chamber 43 between the sealing position shown with respect to ports 32 to an upper position in which ports 32 are connected to the high pressure within the tank 19. Note that sealing gaskets 50 and 51 may be used to form an improved seal between the sleeve valve 43 and the support structure 31 at the top and bottom of ports 32.

The sleeve valve 43 is then normally biased to its valve closed position by suitable biasing springs such as biasing springs 52 and 53 which are suitably disposed around the axis of the coil, and are held between suitable channels in the bottom of support 40 and the outwardly extending flange of sleeve valve 43.

The coil or winding 17 and sleeve valve 43 define the valve section 18 of FIGURE 1. Thus, the valve is normally biased closed by the springs 52. When, however, winding 17 is energized due to the flow of arc current in the spark gap 12 of FIGURE 1, winding 17 will exert an attractive force on the sleeve valve 43, which is of metallic material, so that the sleeve valve 43 will be moved upwardly and held in its upper position until the spark gap current is extinguished.

Sleeve valve 43 will open in 2 to 3 milliseconds after the striking of an arc. This would then normally connect the high pressure gas in tank 19 to the exhaust ports 33 and 34, although this connection will be seen to be prevented by the valve structure portion which defines the valve 16 of FIGURE 1.

The second valve structure contained in the unitary structure of FIGURE 2 is formed of a valve head 60 which has a cone-shaped lower surface with a concave wall shape for the valve face 61. The valve head 60 is then threadably secured to shaft 62 which extends from movable body 63 which is movably guided within the cylinder-shaped depression 70 of support 31.

The bottom of cylinder 70 then contains a fixed winding 14 (see FIGURE 1), while the movable structure 63 contains a movable winding 15 (see FIGURE 1). The upper end of movable body 63 is then secured to a crossbar 71 which could be a disk (it being noted that all components described in FIGURE 2 are circular in section), and a plurality of biasing springs such as biasing springs 72 and 73 extend from the cross piece 71 to the support 31, thereby to normally bias movable structure 63 and thus winding 15 to its uppermost position shown in FIGURE 2.

The movable member 63 can then be moved downwardly for approximately 0.5 centimeter until the lower end of coil 15 seats atop the upper end of coil 14. Note that when member 63 moves downwardly, valve head 60 moves into sealing engagement with respect to ports 32.

In operation this valve portion of the assemblage, corresponding to valve 16 of FIGURE 1, is normally open since valve head 60 would normally permit communication of high pressure through the ports 32 to the exhaust ports 33 and 34. Note that during normal operating conditions, this connection is defeated by the sleeve valve 43.

However, once current flows through coils 14 and 15, an attractive force will be exerted between coils 14 and 15 (coils 14 and 15 being so wound that this attractive force is achieved) so that the movable member carrying winding 15 moves downwardly with the valve head 60 blocking ports 32 which will be subsequently opened by the upward movement of sleeve 43. This closing will occur in less than 2 milliseconds so that valve 16 closes before valve 18 opens since valve 18 requires more than 2 milliseconds to open. So long as arc current flows in the circuit including coils 14 and 15, the relatively light and high speed valve structure including valve head 60 will prevent the discharge of extinguishing air to the nozzle 20 of FIGURE 1, and thus to the spark gap 12.

When, however, the arc current in spark gap 12 decreases, due to a decrease in the transmission line fault current toward a value sufficiently low to permit the reinsertion of capacitor 11 of FIGURE 1 into the transmission line circuit, the attractive force between coils 14 and 15 will decrease so that valve head 60 will begin to move upwardly until the bottom of ports 32 are exposed. Once the bottom of ports 32 are exposed, the high pressure within the tank 19 will flow over the concave surface 61 of valve head 60, thereby tending to accelerate the opening movement of valve head 60 and support member 63 to permit a rapid valve opening operation and discharge of extinguishing gas through nozzle 20 to the spark gap 12. Thus, the spark gap 12 will extinguish at the next current zero so that the sleeve valve 43 will drop the deenergization of winding 17 to close the exhaust ports 32.

The capacitor 11 will now be returned to the transmission line circuit 10 and, since it has been returned under a condition at which the capacitor 11 can remain in the line, there will be no subsequent operation of the spark gap 12 and thus, no subsequent operation of valves 16 and 18 for continued exhaust of air through nozzle 20.

Figure 3:
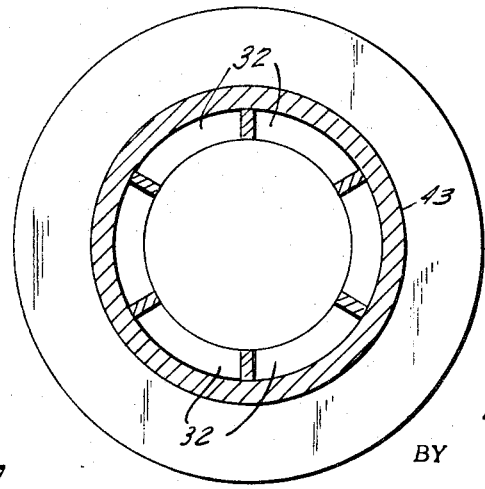
FIGURE 3 is a cross-sectional view of the intake port section of FIGURE 1, and is taken across the line 3—3 in FIGURE 1.

In the specific design of the components of FIGURES 2 and 3, there are important relationships between the movement of the components and the spark gap current. That is to say, the movement of the valve 60, in accordance with the invention, is caused at the most appropriate time within the fault sequence.

It will be apparent that the force between coils 14 and 15 will vary as the square of the spark gap current. This variation is shown in FIGURE 4, and provides an inherent means for determining the proper release point at which valve 60 should admit a gas blast into the gap space of the spark gap 12.

It is normally desirable to be able to reinsert the series capacitor 11 into the transmission line 10 when the transmission line fault current has been reduced to approximately twice the line's normal rated current. This value may be related to the spark gap flashover voltage by a factor ranging between 1.4 and 2.0, with these numbers referring to per unit values for the transmission line current as related to rated current.

This means that a force difference experienced between coils 14 and 15 will be related by values of 2 and 4 (1.4 and 2.0 squared). Therefore, the arrangement shown in FIGURE 2 can permit the clear differentiation between a fault current and a momentary overload current on the transmission line.

For stability reasons, it is essential that the capacitor 11 be reinserted into the transmission line 10 upon removal of the fault, even though the current magnitude exceeds the rated capacitor current. Since the system of FIGURE 2 utilizes the square of the current versus the force between the coils, the system provides sensitive magnitude detection in a manner similar to that used in an electrodynameter ammeter in measuring current. Calibration is accomplished in the compression of springs 72 and 73.

In considering the further operation of the system and the design of the components, it is seen from the above that the force on the coils 14 and 15 which determine the movement of valve head 60 will be a function of the current squared in the spark gap circuit.

If the fault current is of the form $$I_m \sin \omega t$$

the square will be $$I_m^2 \sin^2 \omega t = \tfrac{1}{2}(1 - \cos 2\omega t)$$

where $I_m$ is the peak current and $\omega t$ is in radians.

This force relationship is shown in FIGURES 6 and 7. It is clear that below the horizontal force line 80 in FIGURES 6 and 7, the valve body 63 is free to move toward a position opening the valve head 60. (It has been presumed that the head 60 has already been moved downwardly to its valve closed position.) The movable mass, however, is designed to be sufficiently large that it cannot accelerate between the time $t_1$ of FIGURE 6 a sufficiently far distance to release the coupling between coils 14 and 15 so that the coil 15 would continue to move upwardly to the open position.

Thus, in the condition of FIGURE 6 where the fault current magnitude is relatively large and the capacitor must be held out of the transmission line circuit, the current through the spark gap and through the coils 14 and 15 will be sufficiently large to hold valve head 60 in the closed condition.

In FIGURE 7, however, the current in the transmission line circuit has been reduced to something less than twice the rated capacitor current, whereupon the force curve is reduced in magnitude such that the force sufficiently low to permit opening movement of the movable valve structure lasts for a longer time $t_2$ than the time $t_1$ in FIGURE 6.

The release time $t_2$ is sufficiently long that springs 72 and 73 can accelerate coil 15 to a sufficiently far enough distance from coil 14 to upset the magnetic coupling condition between the coils. This will partially open the valve ports 32 to permit the flow of gas through ports 32 and the subsequent rapid acceleration of the movable structure 63 upwardly because of the pressure applied to concave face 61, thereby to completely open the ports.

While FIGURE 2 illustrates the embodiment of the invention in which the movable coil 15 and valve head 60 are separate members, FIGURE 5 illustrates the manner in which these two components can be incorporated into a common unit. More particularly, in FIGURE 5 those components similar to components of FIGURE 2 have been given similar numerals, and the valve head 90 is formed of conductive material, thereby to act as a short circuited turn with respect to the stationary coil 19. Thus, stationary coil 91 replaces stationary coil 14 of FIGURE 2, while the valve head 90 in FIGURE 5 is made of conductive material to replace the functions of valve head 60 and coil 15 in FIGURE 2.

In FIGURE 5, the valve system is operated by repulsion between stationary coil 91 and conductive valve 90 as contrasted to the operation due to the attraction of coils 14 and 15 in FIGURE 2. In all other respects, however, the operation and concepts of FIGURES 2 and 5 are identical.

In FIGURE 5, the conductive ring 90 is carried on nonmagnetic piston 92 which is guided within support structure 31. The enlarged upper head of piston 92 moves within a chamber 93 in support structure 31 which receives suitable biasing springs 94 and 95 which serve the function of the biasing springs 72 and 73 in FIGURE 2.

In the system of FIGURE 5, the winding 17 operates in the usual manner to open the normally closed sleeve valve 43 once a current begins to pass through the spark gap circuit. However, the opening of ports 32 is prevented since this same current will energize winding 91 which will induce current in conductive ring 90 which is in such a direction as to drive valve head 90 downwardly against the biasing force of springs 94 and 95.

Valve head 90 will then position itself in front of ports 32 to prevent the connection of high pressure air to the exhaust ports 33 and 34 until the current through coil 91 and the arc gap has reduced sufficiently to permit the biasing force of springs 94 and 95 to move the valve head 90 upwardly as described in FIGURES 6 and 7. This will then permit a blast of air to pass through ports 32 and out of exhaust ports 33 and 34. Once the arc is extinguished, the winding 17 is deenergized and sleeve valve 43 closes in the usual manner.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination for an arc extinguishing system; a pair of spaced conductive members for conducting arc current, a high pressure storage tank for storing arc extinguishing fluid under high pressure, first and second valve means, a discharge nozzle for discharging arc extinguishing gas into the space between said pair of spaced conductive members; said first and second valve members pneumatically connected in series between said high pressure storage tank and said discharge nozzle; first magnetic operating means connected to said first valve for operating said valve between an open and closed position; second magnetic means connected to said second valve for operating said second valve between an open and closed position; said first and second magnetic means including first and second winding means coupled to the arc current through said pair of spaced conductive members; said first valve means normally in its said closed position and moved to its said open position by said first magnetic operating means when arc current flows through said first and second spaced conductive members; said second valve means normally in its said open position and moved to its said closed position when arc current above some predetermined magnitude flows through said first and second spaced conductive members; said second valve means moved to its said open position by said second magnetic means when said arc current is below said predetermined magnitude whereby both said first and second valves are open to permit application of high pressure gas to said discharge nozzle only when arc current below a predetermined magnitude flows through said first and second spaced conductive members.

2. In a capacitor protection circuit for a capacitor connected in a transmission line; a spark gap comprising a pair of spaced conductive members connected in parallel with said capacitor and adapted to arc over responsive to transmission line fault current through said capacitor which exceeds a first value; an arc extinguishing system for moving high dielectric gas through said spark gap when the current in said transmission line decreases below a predetermined magnitude at which it is desired to place the capacitor back into service; said arc extinguishing system including a high pressure storage tank for storing arc extinguishing fluid under high pressure, first and second valve means, a discharge nozzle for discharging arc extinguishing gas into the space between said pair of spaced conductive members; said first and second valve members pneumatically connected in series between said high pressure storage tank and said discharge nozzle; first magnetic operating means connected to said first valve for operating said valve between an open and closed position; second magnetic means connected to said second valve for operating said second valve between an open and closed position; said first and second magnetic means including first and second winding means coupled to the arc current through said pair of spaced conductive members; said first valve means normally in its said closed position and moved to its said open position by said first magnetic operating means when arc current flows through said first and second spaced conductive members; said second valve means normally in its said open position and moved to its said closed position when arc current above some predetermined magnitude flows through said first and second spaced conductive members; said second valve means moved to its said open position by said second magnetic means when said arc current is below said predetermined magnitude whereby both said first and second valves are open to permit application of high pressure gas to said discharge nozzle only when arc current below a predetermined magnitude flows through said first and second spaced conductive members.

3. The device as set forth in claim 1 wherein said second valve means includes a disk-shaped valve member axially movable with respect to at least one valve port communicating with said discharge nozzle; the interior of said valve port positioned adjacent the periphery of said disk-shaped valve member; said disk-shaped valve member moving above said port to move said second valve to its said open position and moving adjacent said port to move said second valve to its said closed position.

4. The device as set forth in claim 3 wherein said disk-shaped valve member has a generally conical shape with a downwardly facing apex and concave side surfaces extending from its said apex whereby a slight initial opening of said port permits the initial flow of gas over said concave surfaces to accelerate said disk-shaped valve member upwardly toward a full open position.

5. The device as set forth in claim 3 wherein said second valve means includes an annular sleeve member movable along the axis of said disk-shaped valve member and enclosing the exterior of said valve port; said annular sleeve moving above said port to move said first valve to its said open position and moving adjacent said exterior of said valve port to move said second valve to its said closed position.

6. The device as set forth in claim 3 wherein said second winding means includes a first and second relatively movable winding; said first winding directly connected to said valve member; said second winding stationarily positioned with respect to said first winding; energization of at least said second winding generating magnetic forces between said first and second windings to move said first winding and said disk-shaped valve member from its said normally open position to its said closed position.

7. The device as set forth in claim 6 wherein said disk-shaped valve member is at least partially of conductive material defining said first winding.

8. The device as set forth in claim 5 wherein said second winding means includes a first and second relatively movable winding; said first winding directly connected to said valve member; said second winding stationarily positioned with respect to said first winding; energization of at least said second winding generating magnetic forces between said first and second windings to move said first winding and said disk-shaped valve member from its said normally open position to its said closed position.

9. The device as set forth in claim 8 wherein said annular sleeve is of conductive material to define a short-circuited turn; said first winding means inducing current in said sleeve responsive to energization thereof by arc current flow thereby to impose magnetic forces between said annular sleeve and said first winding means to move said annular sleeve from its said normally close position to its said open position.

References Cited

UNITED STATES PATENTS

| | | | |
|---|---|---|---|
| 2,660,693 | 11/1953 | Marbury | 317—12 |
| 2,949,567 | 8/1960 | Johnson | 317—12 |
| 3,275,886 | 9/1966 | Skeats | 317—12 |
| 3,335,362 | 8/1967 | Cuffino | 317—12 X |

LEE T. HIX, *Primary Examiner.*

R. V. LUPO, *Assistant Examiner.*

U.S. Cl. X.R.

200—148